United States Patent
Yeh et al.

(10) Patent No.: US 8,427,734 B2
(45) Date of Patent: Apr. 23, 2013

(54) THREE-DIMENSIONAL IMAGE DISPLAY DEVICE AND ELECTROCHROMIC MODULE THEREOF

(75) Inventors: Yu-Chou Yeh, Taoyuan County (TW); Chao-Yi Wang, Taoyuan County (TW); Wen-Chih Lo, Taoyuan County (TW); Tsung-Her Yeh, Taipei County (TW)

(73) Assignee: J Touch Corporation, Taoyuan County (TW)

( * ) Notice: Subject to any disclaimer, the term of this patent is extended or adjusted under 35 U.S.C. 154(b) by 110 days.

(21) Appl. No.: 13/008,227

(22) Filed: Jan. 18, 2011

(65) Prior Publication Data

US 2012/0120476 A1 May 17, 2012

(30) Foreign Application Priority Data

Nov. 12, 2010 (TW) ................................ 99139055 A

(51) Int. Cl.
*G02F 1/153* (2006.01)
(52) U.S. Cl.
USPC .......................................................... 359/270
(58) Field of Classification Search .......... 359/265–275; 348/51; 345/49, 105
See application file for complete search history.

(56) References Cited

U.S. PATENT DOCUMENTS

| | | | | |
|---|---|---|---|---|
| 4,773,741 A * | 9/1988 | Inaba et al. | .................. | 359/266 |
| 6,211,995 B1 * | 4/2001 | Azens et al. | .................. | 359/273 |
| 6,768,574 B2 * | 7/2004 | Bertran Serra et al. | ........ | 359/265 |
| 7,999,992 B2 * | 8/2011 | Mazurkiewicz et al. | ..... | 359/273 |
| 8,115,985 B2 * | 2/2012 | Liu | .................. | 359/273 |
| 2005/0179012 A1 * | 8/2005 | Kwon et al. | .................. | 252/582 |
| 2009/0242113 A1 * | 10/2009 | Radmard et al. | ........... | 156/275.5 |
| 2010/0159294 A1 * | 6/2010 | Fly et al. | ......................... | 429/12 |

FOREIGN PATENT DOCUMENTS

| | | | |
|---|---|---|---|
| EP | 000197465 | * | 10/1986 |
| TW | 296723 | I | 1/2008 |
| TW | 371902 | M | 4/2009 |
| TW | 368088 | M | 11/2009 |

* cited by examiner

*Primary Examiner* — Tuyen Tra
(74) *Attorney, Agent, or Firm* — Rosenberg, Klein & Lee

(57) ABSTRACT

A 3D image display device includes a display module, an electrochromic module, a control element and a sensing element. The display module is provided for generating a left-eye image and a right-eye image. The electrochromic module is comprised of a first transparent substrate, a first transparent conductive element, a plurality of first electrochromic elements, an electrolyte layer, a plurality of second electrochromic elements, a second transparent conductive element and a second transparent substrate. The second electrochromic elements are arranged orthogonally with the first electrochromic elements. The control element is provided for switching the voltage of the first and second transparent conductive elements. The sensing element is provided for sensing a rotating direction of the 3D image display device and transmitting a sensing signal to the control element to change the color of the first or second electrochromic element, so as to produce a parallax barrier.

21 Claims, 23 Drawing Sheets

THREE-DIMENSIONAL IMAGE DISPLAY DEVICE AND ELECTROCHROMIC MODULE THEREOF

CROSS-REFERENCE TO RELATED APPLICATIONS

This non-provisional application claims priority under 35 U.S.C. §119(a) on Patent Application No(s). 099139055 filed in Taiwan, R.O.C. on Nov. 12, 2010, the entire contents of which are hereby incorporated by reference.

BACKGROUND OF THE INVENTION

1. Field of the Invention

The present invention relates to a three-dimensional (3D) image display device and an electrochromic module of the 3D image display device, and more particularly to a 3D image display device and its electrochromic module for changing a direction of displaying 3D images.

2. Description of the Related Art

At present, there are two types of 3D images, respectively: a 3D image viewed by naked eyes and a 3D image viewed by wearing a pair of shutter glasses.

With reference to FIGS. 1 and 2 for schematic views of a conventional 3D image display device for generating a 3D image by a pair of shutter glasses and its synchronous control process respectively, after a light emitted from a backlight 13 passed through an LCD panel 12, both left and right eyes will receive left-eye image data and right-eye image data of the 3D image display device 1 at different time points to produce a visual separation effect. The left-eye image data and right-eye image data displayed alternately must be operated by a shutter glasses 11 and a control circuit (not shown in the figure) synchronously, wherein a switch signal is provided for controlling the ON/OFF of the left and right eyes of the shutter glasses 11. After the left and right eyes are turned ON/OFF, and the switch timing is synchronous with the images received by the LCD panel 12, and the left-eye image data are displayed, the shutter will screen the vision of the right eye. On the other hand, when the right-eye image data are displayed, the shutter glasses will screen the vision of the left eye. As a result, the left-eye and right-eye images can be displayed alternately and quickly. With the persistence of vision, a 3D visual effect is achieved, and such 3D imaging method is called "time division".

In addition to the time division, there is a wavelength division, wherein a relatively red and green screen is processed for the left-eye and right-eye images first, and a viewer wears a pair of color glasses with red color for the left eye and green color for the right eye, such that the viewer's left eye can see the red left-eye image only, and the viewer's right eye can see the green right-eye image only, and the left and right screens of different colors are processed to create 3D images.

In addition to the device of the foregoing two types of divisions, there is a 3D image display device manufactured by using the Pulfrich effect. The 3D image display device comprises a pair of Pulfrich 3D glasses, wherein one of the lenses of the 3D glasses further comprises a neutral filter, and both pieces of the left-eye lens and right-eye lens have different light transmittances, and our brain responds to a darkness stimulation slightly slower than a brightness stimulation, so as to produce an optical illusion. Although both of our eyes can see the same image, when the image is passed through a light filter, the speed for an eye to transmit the image to our brain is slower that that of the other eye, such that a virtual spatial depth can be created to produce the 3D effect.

In the method of displaying 3D images through a pair of 3D glasses, related technologies are mature and used extensively in movie, television and projector industries. However, a pair of glasses is required, and thus it creates a problem to users who already wear a pair of near-sighted or far-sighted glasses. In addition, there is a hygiene issue when the 3D glasses are used in public, and many users feel uncomfortable and have the side effects of dizziness and nausea. Wearing a pair of 3D glasses may be a psychological burden to some users, and an obstacle to the development of the 3D image technology.

In bare eyesight 3D display technologies, there are two main types of structures, respectively: a lenticular lens and a barrier, wherein the lenticular lens arranges a plurality of slender convex lenses continuously along the direction of an axis to produce different viewing figures of left and right eyes by the principle of optical refraction. Compared with the barrier type, the lenticular lens has a smaller loss of light and a better brightness, but there is a limited refraction effect at edges of the lens since the lenticular lens achieves the effect of splitting a light by refractions, and thus the refraction is not as good, or it is difficult to control the precision during the manufacture of the lenticular lens, so that a stray light may be produced easily during its application, and the overall display effect is affected adversely.

In addition, the barrier type uses a whole row of barriers for restricting lights from projecting from certain angles, and only allowing viewing images at certain angles to be transmitted to the viewer's left and right eyes to produce a 3D image. Compared with the lenticular lens, the barrier type provides a sharper image for a single eye, but its structural characteristic will lower the overall image brightness and resolution.

As the material technology advances, electrically conducted electrochromic materials with the coloration and decoloration properties are gradually used as a parallax barrier for producing 3D images. As disclosed in R.O.C.(TW) Pat. No. M368088 entitled "Integrated electrochromic 2D/3D display device, R.O.C. Pat. No. M371902 entitled "Display device for switching 2D image/3D image display screen", R.O.C. Pat. No. I296723 entitled "Color filter used for 3D image LCD panel manufacturing method thereof", the electrochromic material is used as a parallax barrier structure for displaying 3D images, but both patents of M368088 and M371902 have a common drawback of lacking a necessary electrolyte layer required by electrochromic devices, since ions are not supplied to the electrolyte layer of the electrochromic layer, and the electrochromic device cannot produce the reversible oxidation or reduction to complete the change of coloration or decoloration, so that the aforementioned patents are not feasible in practical applications. In addition, the transparent electrode layer and electrochromic material layer of the parallax barrier device are grid patterned, and whose manufacturing process requires a precise alignment for coating, spluttering or etching each laminated layer, and thus the manufacturing process is very complicated, and the resistance will be increased to slow down the response time, and all laminated layers are grid patterned, so that a hollow area is formed between grids, and the overall penetration, refraction and reflection of the light will be affected. Even for the general 2D display, the video display quality of the display device will be affected to cause problems related to color difference and uneven brightness.

In addition, the prior art for displaying 3D images displays the 3D images in one direction only. As to the portable or mobile electronic products such as mobile phones, personal digital assistants, navigators, users can only turn the electronic products to a specific direction to view the 3D images, but the users cannot change the angle for a 3D display, and such application is very inconvenient.

SUMMARY OF THE INVENTION

In view of the aforementioned shortcomings, the inventor of the present invention based on years of experience in the related industry to conduct extensive researches and experiments, and finally developed a novel 3D image display device and an electrochromic module of the 3D image display device in accordance with the present invention.

To achieve the foregoing objectives, the present invention provides a 3D image display device and its electrochromic module, wherein the display device can show 3D images regardless of turning the display device to a horizontal or vertical direction.

To achieve the foregoing objectives, the present invention also provides an electrochromic module, comprising a first transparent substrate, a first transparent conductive element, a plurality of first electrochromic elements, an electrolyte layer, a plurality of second electrochromic elements, a second transparent conductive element, and a second transparent substrate.

The electrochromic module further comprises a first protective layer and a second protective layer, wherein the first protective layer is disposed between the electrolyte layer and the first electrochromic element, and the second protective layer is disposed between the electrolyte layer and the second electrochromic elements.

The first protective layer and the second protective layer is a silicon dioxide ($SiO_2$), aluminum oxide ($Al_2O_3$), tetramethyldisiloxane or carbon-silicon-oxygen film.

The first transparent substrate and the second transparent substrate are made of a material selected from the collection of plastic, polymer plastic and glass, or a plastic polymer selected from the collection of resin, polyethylene terephthalate (PET), polycarbonate (PC), polyethylene (PE), polyvinyl chloride (PVC), polypropylene (PP) and polystyrene (PS) and polymethylmethacrylate (PMMA), and a mixture of the above.

The first electrochromic elements are formed on the first transparent substrate by using a sol-gel method, a sputtering method, a plating method, a screen printing method, a spray coating method, an anodizing method, a photopolymerization method, an electrophoresis method, an electrochemical synthesis deposition method, or a laser etching method.

The second electrochromic elements are for lied on the second transparent substrate by using a sol-gel method, a sputtering method, a plating method, a screen printing method, a spray coating method, an anodizing method, a photopolymerization method, an electrophoresis method, an electrochemical synthesis deposition method, or a laser etching method.

The first electrochromic elements and the second electrochromic elements are anodic coloration, cathodic coloration and cathodic/anodic coloration transition metal oxides or organic electrochromic materials.

The first electrochromic elements and the second electrochromic elements are anodic coloration transition metal oxides selected from the collection of chromium oxide ($Cr_2O_3$), nickel oxide ($NiO_x$), iridium oxide ($IrO_2$), manganese oxide ($MnO_2$), nickel hydroxide [$Ni(OH)_2$], tantalum pentoxide ($Ta_2O_5$) and ferric ferrocyanide ($Fe_4[Fe(CN)_6]_3$).

The first electrochromic elements and the second electrochromic elements are cathodic coloration transition metal oxides selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$), and tantalum pentoxide ($Ta_2O_5$).

The first electrochromic elements and the second electrochromic elements are cathodic/anodic coloration transition metal oxides selected from the collection of vanadium pentoxide ($V_2O_5$), rhodium oxide ($Rh_2O_3$) and cobalt oxide ($CoO_x$).

The first electrochromic elements and the second electrochromic elements are organic electrochromic materials selected from the collection of redox compounds and their derivatives, conductive polymers and their derivative, polymeric metal complexes and their derivatives, transition metal and lanthanum based ligand complexes and their derivatives, and a metal phthalocyanine and its derivatives, or the organic electrochromic material is ferrocene and iron(III) thiocyanate dissolved in water solution, hexacyanoferrate dissolved in tetracyanoquinone, sulfur (IV) cyanide dissolved in acetonitrile.

The electrolyte layer is a solid-state electrolyte or liquid-state electrolyte.

The solid-state electrolyte is a proton exchange membrane.

The proton exchange membrane is an ionomer membrane, an organic-inorganic hybrid membrane, a membrane based on polymer and oxo-acids or a polymerized perfluorosulfonic acid (PFSA) film.

The liquid-state electrolyte is lithium perchlorate ($LiClO_4$), potassium hydroxide (KOH), sodium hydroxide (NaOH) or sodium silicate.

To achieve the foregoing objective, the present invention provides a 3D image display device comprising a display module, an electrochromic module, a control element and a sensing element.

The display module is provided for generating a left-eye image and a right-eye image. The electrochromic module has the structure and material as described above. The control element is provided for switching the voltage of the first transparent conductive element and the second transparent conductive element. The sensing element is electrically coupled to the control element and provided for sensing a rotating direction of the 3D image display device and transmitting a sensing signal to the control element accordingly, so that the first electrochromic elements or the second electrochromic elements can change color to produce a parallax barrier.

The sensing element is a gyroscope or an optoelectric direction sensor.

DETAILED DESCRIPTION OF TILE PREFERRED EMBODIMENTS

Figure 1:
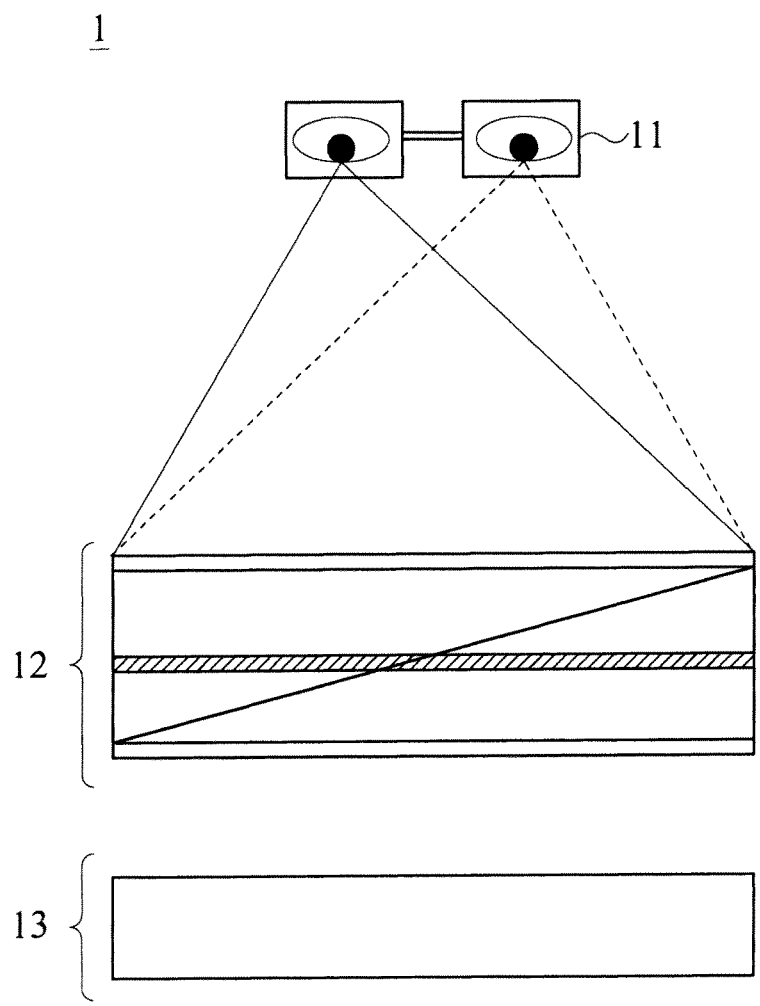
FIG. 1 is a schematic view of a conventional 3D image display device for generating 3D images by shutter glasses.
Figure 2:
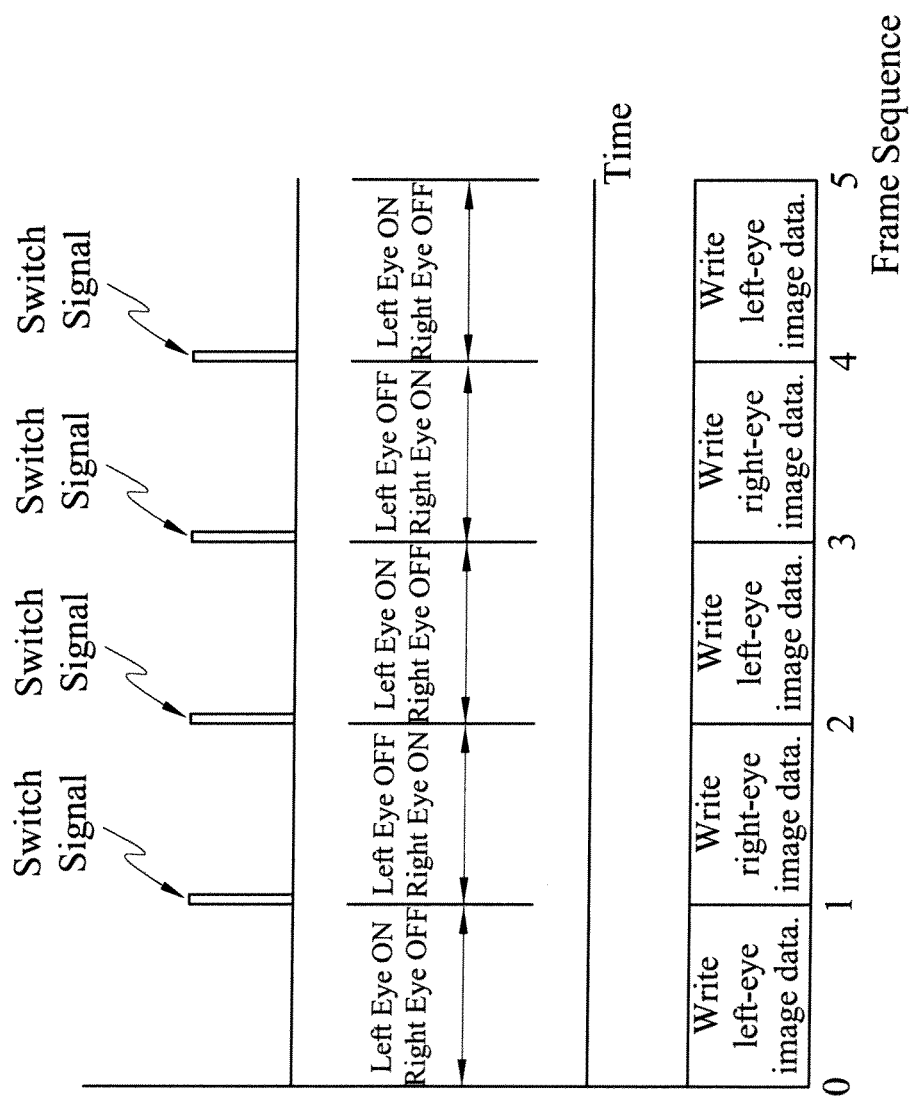
FIG. 2 is a schematic view of a synchronous control process of a conventional 3D image display device for generating 3D images by shutter glasses.
Figure 3:
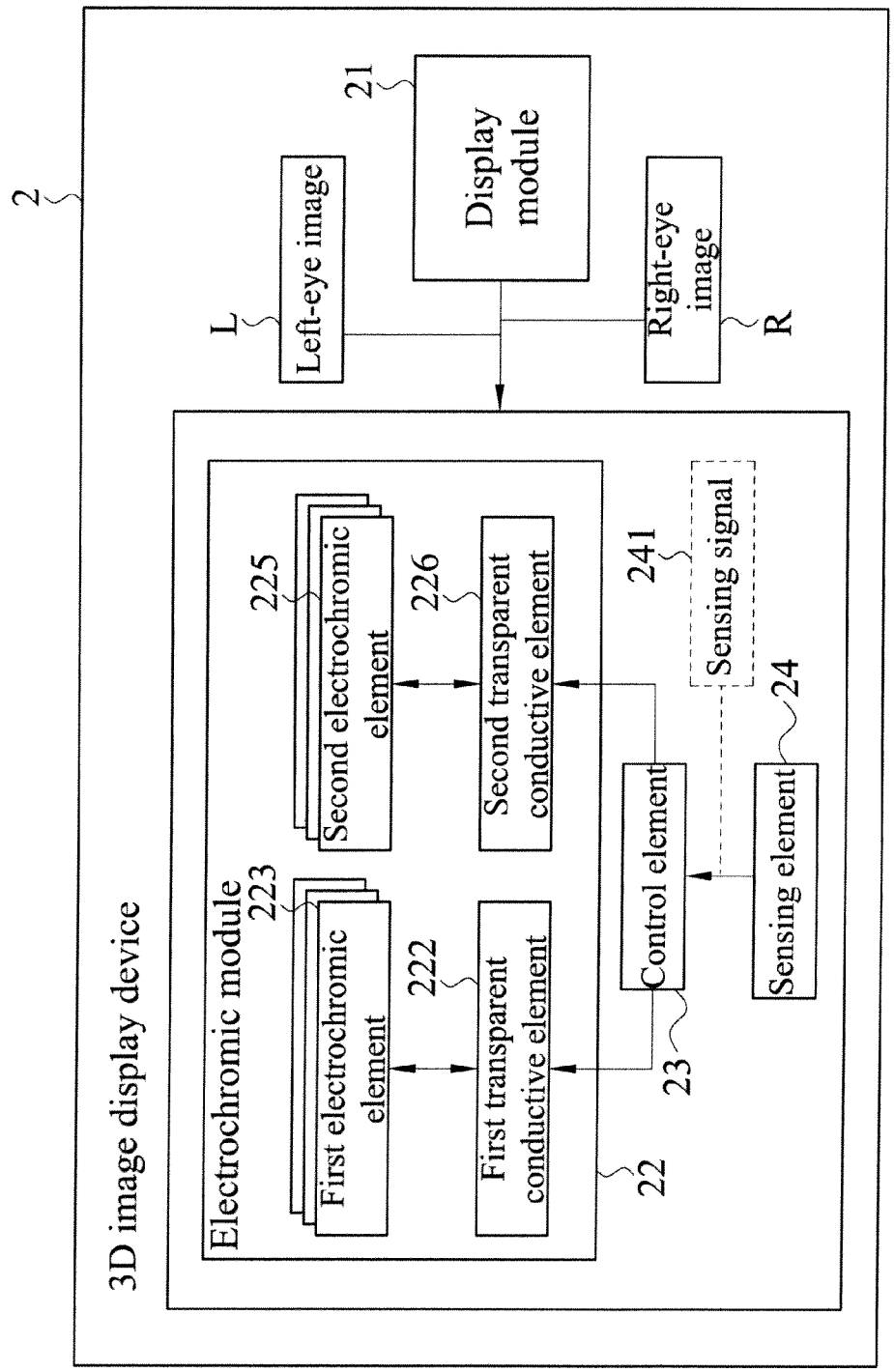
FIG. 3 is a block diagram of a 3D image display device in accordance with a first preferred embodiment of the present invention.
Figure 4A:
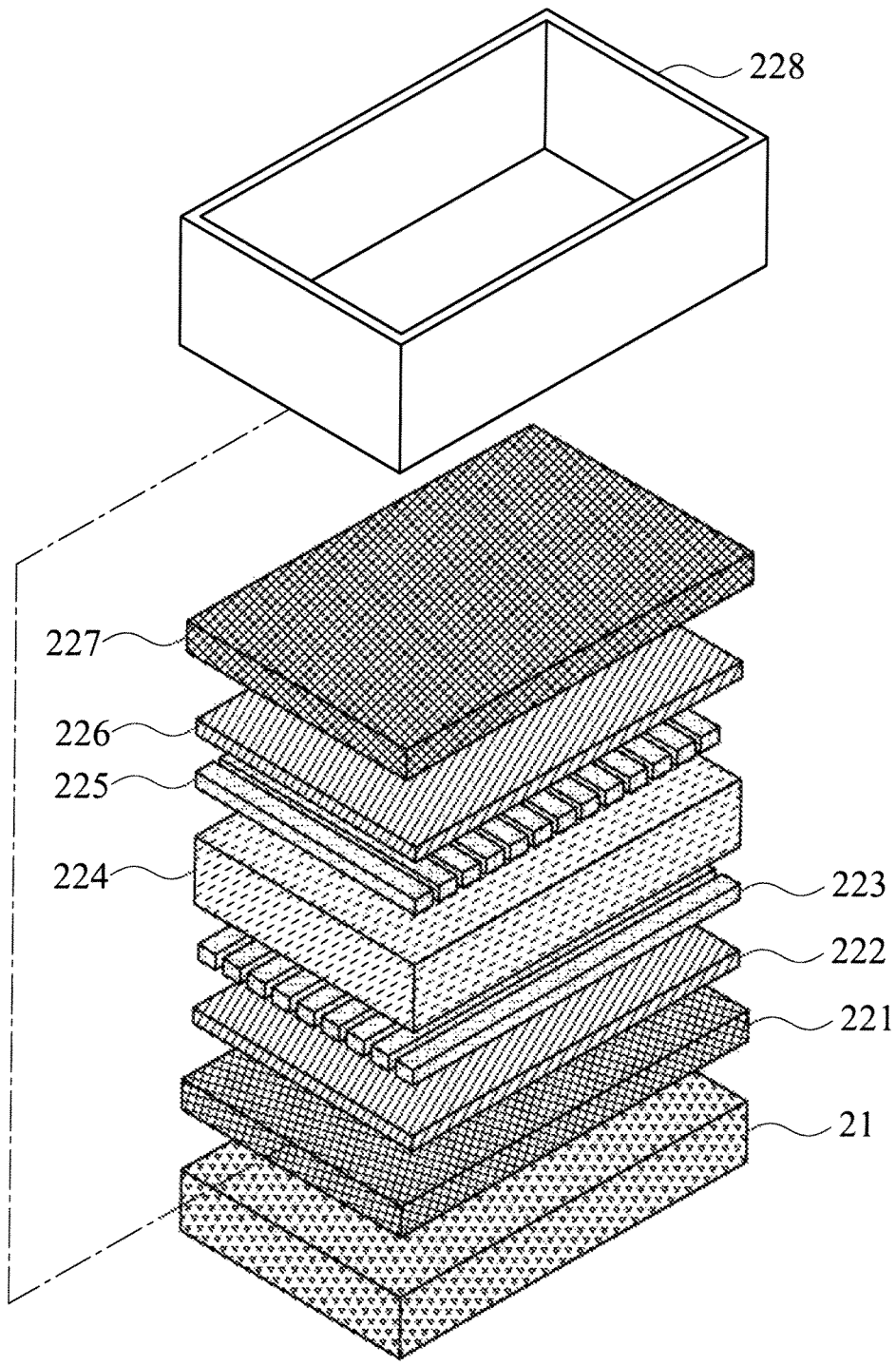
FIG. 4A is an exploded view of a 3D image display device adopting a display module combined with an electrochromic module in accordance with a first preferred embodiment of the present invention.
Figure 4B:
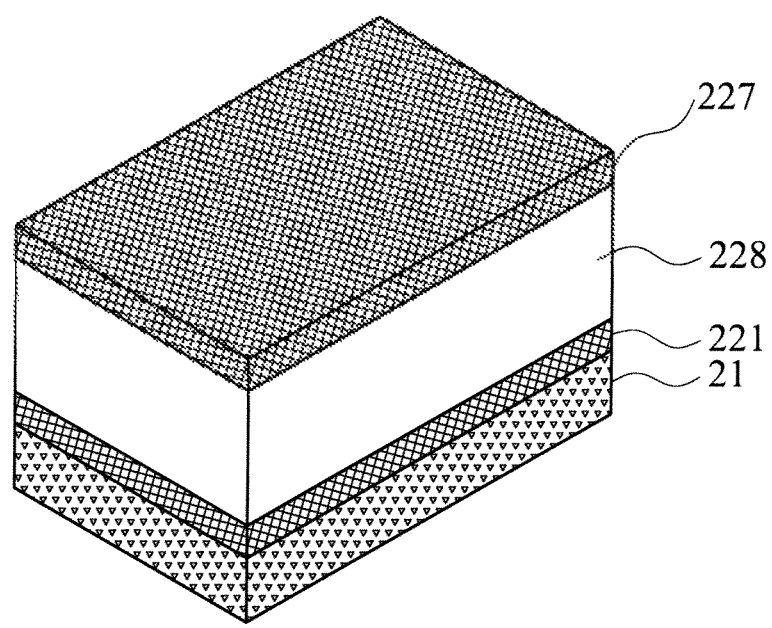
FIG. 4B is a perspective view of a 3D image display device adopting a display module combined with an electrochromic module in accordance with a first preferred embodiment of the present invention.
Figure 4C:
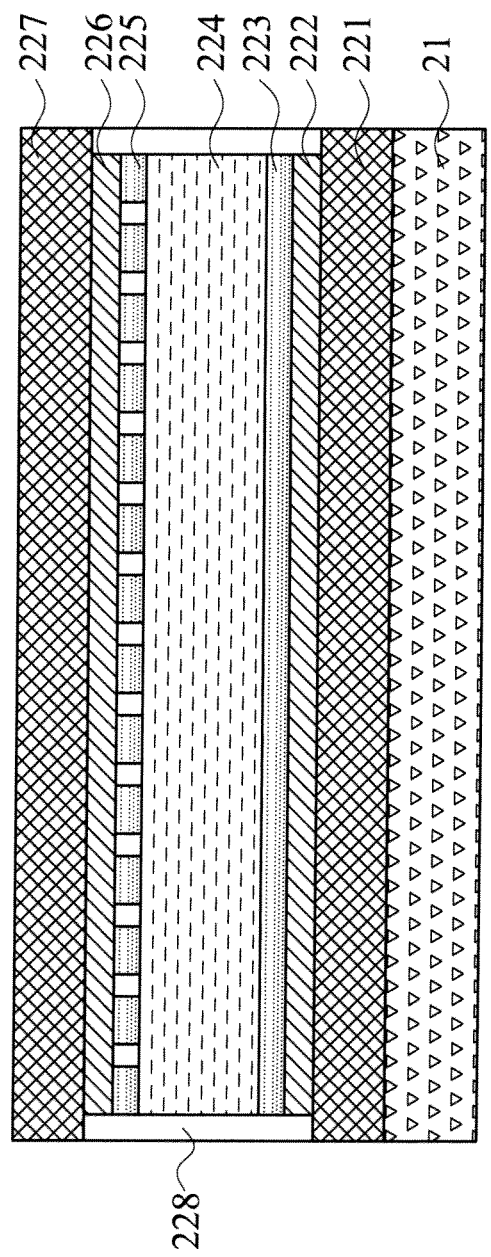
FIG. 4C is a cross-sectional view of a 3D image display device adopting a display module combined with an electrochromic module in accordance with a first preferred embodiment of the present invention.
Figure 5:
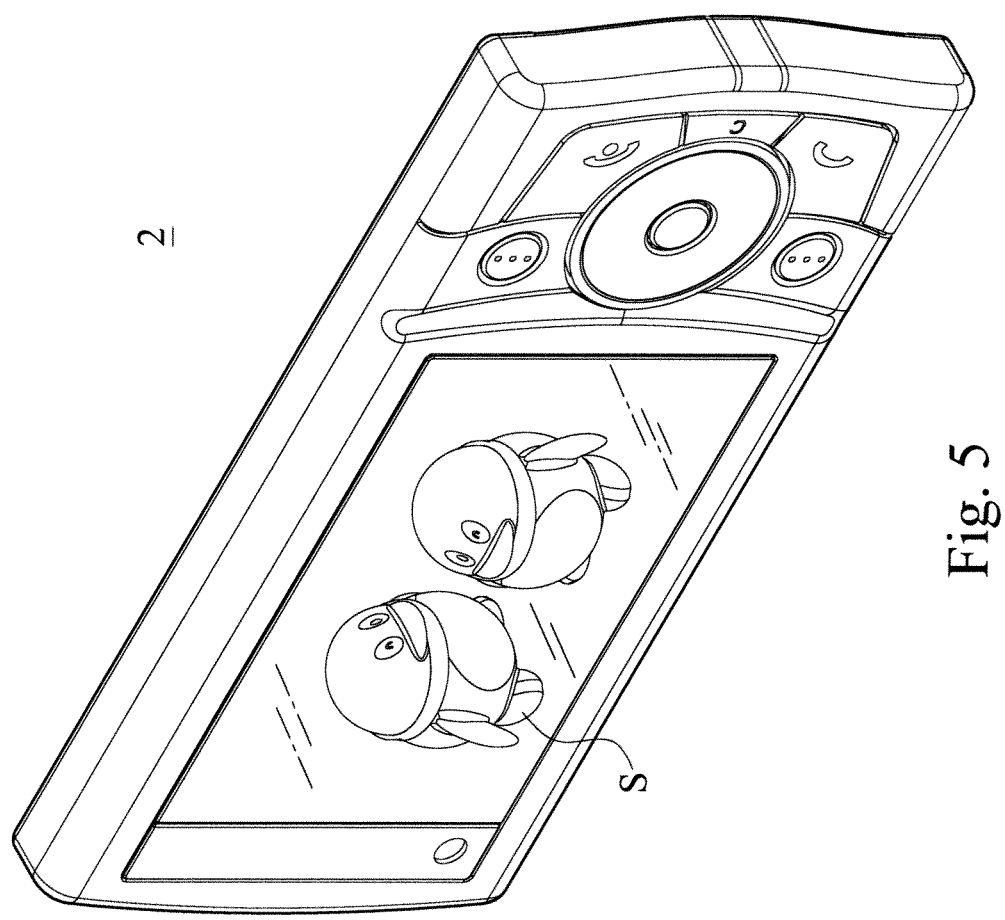
FIG. 5 is a perspective view of a 3D image display device in accordance with a first preferred embodiment of the present invention.
Figure 6:
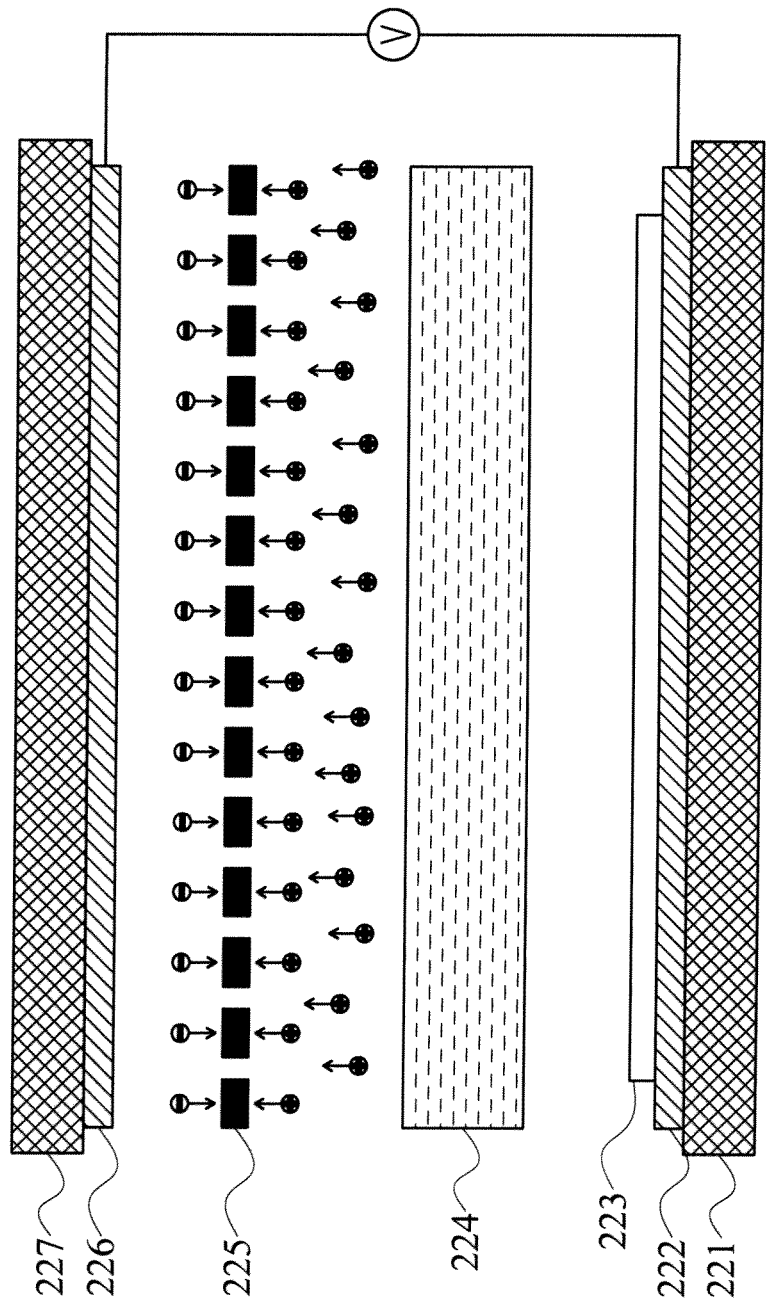
FIG. 6 is a schematic view of a first coloration status of an electrochromic element of a 3D image display device in accordance with a first preferred embodiment of the present invention.
Figure 7:
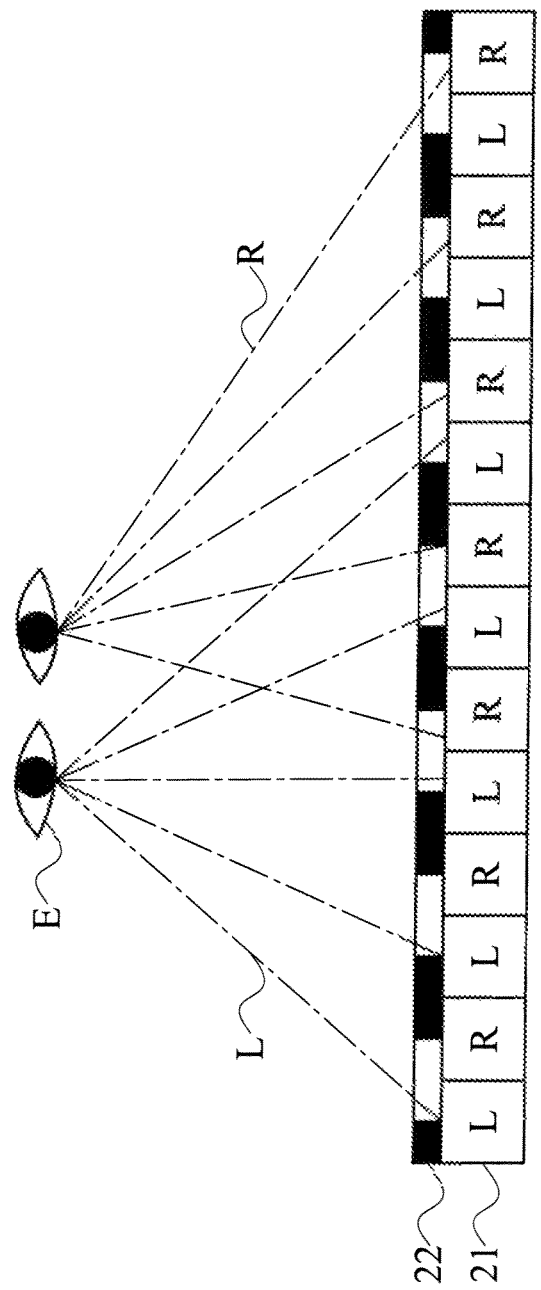
FIG. 7 is a first schematic view of 3D imaging of a 3D image display device in accordance with a first preferred embodiment of the present invention.
Figure 8:
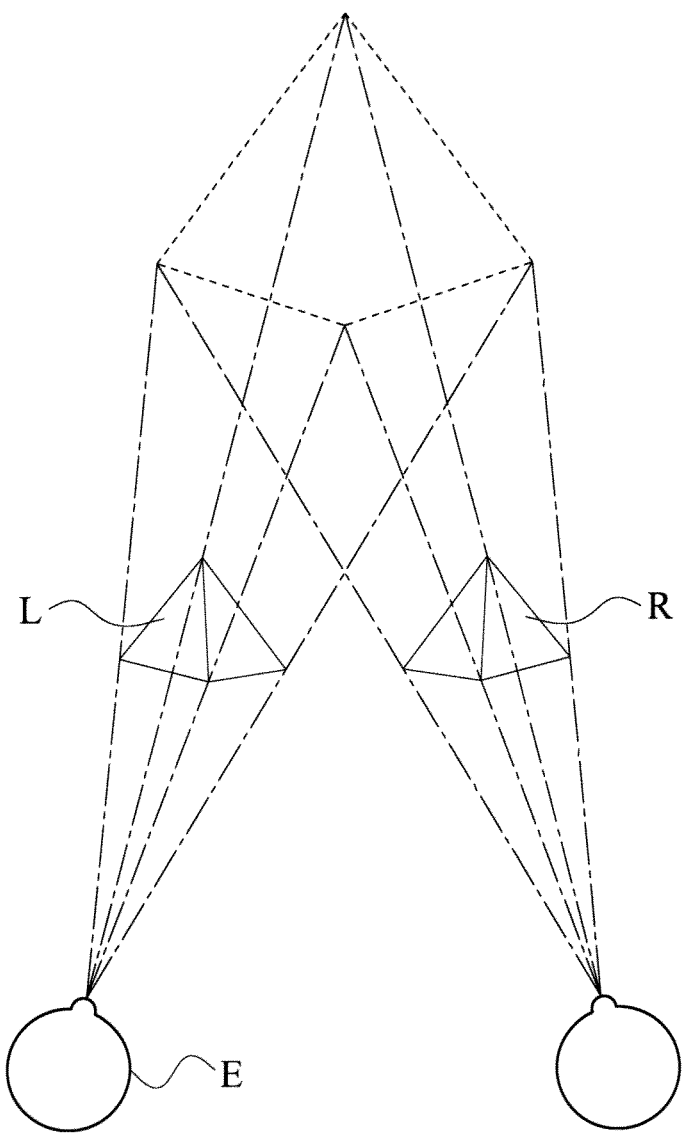
FIG. 8 is a second schematic view of 3D imaging of a 3D image display device in accordance with a first preferred embodiment of the present invention.

The technical characteristics and effects of the present invention will be apparent with the detailed description of preferred embodiment together with the illustration of related drawings as follows.

With reference to FIGS. 3, 4A, 4B and 4C for a block diagram of a 3D image display device, an exploded view of the display module combined with an electrochromic module, a perspective view of the display module combined with the electrochromic module, and a cross-sectional view of the display module combined with the electrochromic module in accordance with a first preferred embodiment of the present invention respectively, the 3D image display device 2 comprises a display module 21, an electrochromic module 22, a control element 23 and a sensing element 24.

The display module 21 is provided for generating a left-eye image L and a right-eye image R. The display module 21 can convert the display information of a 2D image such as a superimposed image including the left-eye image L and the right-eye image R, or directly display the display information of the superimposed image including the left-eye image and the right-eye image by software or firmware. In addition, the display module 21 can be one selected from the collection of a liquid display device (LCD), a plasma display panel (PDP), a surface conduction electron-emitter display (SED), a field emission display (FED), a vacuum fluorescent display (VFD), an organic light-emitting diode (OLED) or e-Paper.

The electrochromic module 22 comprises a first transparent substrate 221, a first transparent conductive element 222, a plurality of first electrochromic elements 223, an electrolyte layer 224, a plurality of second electrochromic elements 225, a second transparent conductive element 226, a second transparent substrate 227 and at least one barrier layer 228. In this preferred embodiment, the form of the barrier layer 228 is not limited to those as shown in the drawings, but it can be a single plate disposed around the periphery of the electrolyte layer 224 or a plurality of plates disposed around the periphery of the electrolyte layer 224. As long as the form can achieve the effect of preventing liquids from leaking from the electrolyte layer 224, such form is covered in the scope of the present invention.

The first transparent substrate 221 is formed on an upper surface of the display module 21. The first transparent conductive element 222 is installed on the top of the first transparent substrate 221. In this preferred embodiment, the first transparent substrate 221 and the second transparent substrate 227 are slabs, thin plates and transparent, and the first transparent substrate 221 and the second transparent substrate 227 are made of a material selected from the collection of plastic, polymer plastic and glass, or a plastic polymer selected from the collection of resin, polyethylene terephthalate (PET), polycarbonate (PC), polyethylene (PE), polyvinyl chloride (PVC), polymethylmethacrylate (PMMA), and a mixture of the above.

The first electrochromic elements 223 are disposed on the top of the first transparent conductive element 222. The electrolyte layer 224 is disposed on the top of the first electrochromic elements 223. The second electrochromic elements 225 are disposed on the top of the electrolyte layer 224. The second transparent conductive element 226 is disposed on the top of the second electrochromic elements 225. Finally, the second transparent substrate 227 is disposed on the top of the second transparent conductive element 226, such that the first electrochromic elements 223, the second electrochromic elements 225, the electrolyte layer 224, the first transparent conductive element 222 and the second transparent conductive element 226 are sealed between the first transparent substrate 221 and the second transparent substrate 227. The first electrochromic elements 223 and the second electrochromic elements 225 are orthogonally arranged with each other. In other words, if the first electrochromic elements 223 are arranged horizontally, the second electrochromic elements 225 are arranged vertically, and if the first electrochromic elements 223 are arranged vertically, the second electrochromic elements 225 are arranged horizontally.

The first electrochromic elements 223 and the second electrochromic elements 225 are covered onto surfaces of the first transparent conductive element 222 and the second transparent conductive element 226 respectively by using a sol-gel method, a sputtering method, a plating method, a screen printing method, an anodizing method, a photopolymerization method, a laser etching method, an electrophoresis method or an electrochemical synthesis deposition method. The first electrochromic elements 223 and the second electrochromic elements 225 are made of a material selected from the collection of anodic coloration, cathodic coloration and cathodic/anodic coloration transition metal oxides and organic electrochromic materials. In general, the anodic coloration material is an anodic coloration transition metal oxide selected from the collection of chromium oxide ($Cr_2O_3$), nickel oxide ($NiO_x$), iridium oxide ($IrO_2$), manganese oxide ($MnO_2$), ferric ferrocyanide ($Fe_4[Fe(CN)_6]_3$) and nickel hydroxide [$Ni(OH)_2$], and the cathodic coloration material is a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$), and tantalum pentoxide ($Ta_2O_5$), and the cathodic/anodic coloration material is a cathodic/anodic coloration transition metal oxide selected from the collection of vanadium pentoxide ($V_2O_5$), rhodium oxide ($Rh_2O_3$) and cobalt oxide ($CoO_x$), and the organic electrochromic material is a redox compound such as bipyridyls, viologen, anthraquinone, tetrathiafulvalene, pyrazolone, and their derivatives, or a conductive polymer such as polyaniline, polypyrrole, polythiophene, poly-3-alkylthiophene, polyfuran, polyphenylene, aromatic polyamide/polyimide, polyphenylenevinylene, and their derivatives, or a polymeric metal complex and its derivative, or a transition metal and lanthanum based ligand complex and its derivatives, or a metal phthalocyanine and its derivative, or ferrocene, iron(III) thiocyanate dissolved in water solution, hexacyanoferrate dissolved in tetracyanoquinone or sulfur (IV) cyanide dissolved in acetonitrile.

In this preferred embodiment, the electrolyte layer 224 is a liquid-state electrolyte.

The liquid-state electrolyte is lithium perchlorate ($LiClO_4$), potassium hydroxide (KOH), sodium hydroxide (NaOH) or sodium silicate ($Na_2SiO_3$).

Both ends of the barrier layer 228 are abutted and coupled to the first transparent substrate 221 and the second transparent substrate 227 to seal the electrolyte layer 224 in the electrochromic module 22.

The control element 23 is electrically coupled to the first transparent conductive element 222 and the second transparent conductive element 226.

The sensing element 24 is electrically coupled to the control element 23 and provided for sensing a direction of the 3D image display device 2 with respect to a horizontal level and transmitting a sensing signal 241 to the control element 23 correspondingly. In this preferred embodiment, the sensing element 24 is a gyroscope, or an optoelectronic direction sensor.

The first electrochromic elements 223 and the second electrochromic elements 225 are made of an electrochromic material that can produce a color change after an electric potential is applied for a reversible oxidation or reduction reaction. The first electrochromic elements 223 and the second electrochromic elements 225 are operated according to a principle of changing the valence of ions of the transition metal element in the electrochromic material to produce a coloration/decoloration reaction.

With reference to FIGS. 5 to 8 for a perspective view of a 3D image display device, a schematic view of a first coloration status of an electrochromic element, a first schematic view of forming a 3D image and a second schematic view of forming a 3D image in accordance with a first preferred embodiment of the present invention respectively, the plane of a display screen of the 3D image display device 2 is defined as a standard surface, and an axis perpendicular to the standard surface is defined as a standard rotation axis, and the horizontal axis and the vertical axis of the standard surface are defined as a horizontal direction and a vertical direction respectively. Compared with the standard rotation axis, each rotation of ¼ round can change the bias voltage of first and second transparent conductive elements 222, 226 to change the parallax barrier in the horizontal direction or the vertical direction. If the 3D image display device 2 is disposed in a horizontal direction, and the control element 23 applies a bias voltage to the first transparent conductive element 222 and the second transparent conductive element 226, then ions stored in the electrolyte layer 224 will be dispersed and moved to the second electrochromic elements 225. In the meantime, electrons also move from the second transparent conductive element 226 to the second electrochromic element 225 to maintain the second electrochromic elements 225 electrically neutral. After the electrons and ions are filled into the second electrochromic elements 225 simultaneously, the oxidation/reduction state of the second electrochromic elements 225 is changed gradually, such that the refractive index and the transmittance of the second electrochromic elements 225 are changed accordingly, and the second electrochromic elements 225 are changed from a transparent state to a colored state to form an opaque light shading area, and arranged to produce a parallax barrier. After a superimposed image of the left-eye image L and right-eye image R generated by the display module 21 is passed through the light shading areas, a portion of the superimposed image area is removed, such that a moiré will not be produced after naked eyes E receive the superimposed image. Since human eyes have a binocular disparity, the image difference produced after the left-eye image L and right-eye image R are received by the left and right eyes respectively can be used for sensing and determining the depth of an observing object, and the left-eye image L and right-eye image R are combined into form a 3D image S in a viewer's brain.

Figure 9:
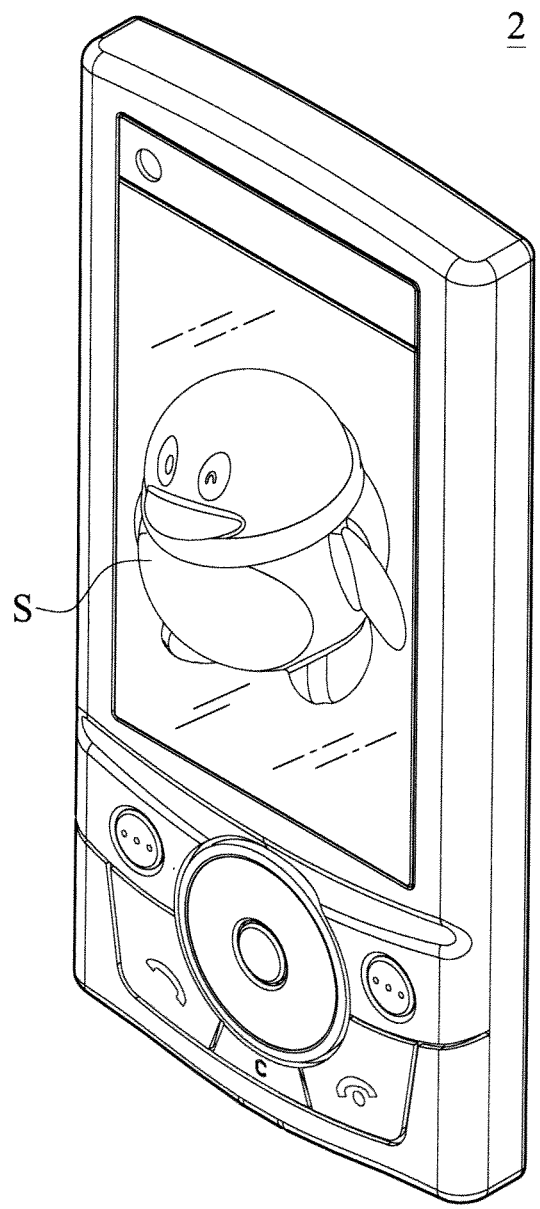
FIG. 9 is a perspective view of a 3D image display device after being rotated in accordance with a first preferred embodiment of the present invention.
Figure 10:
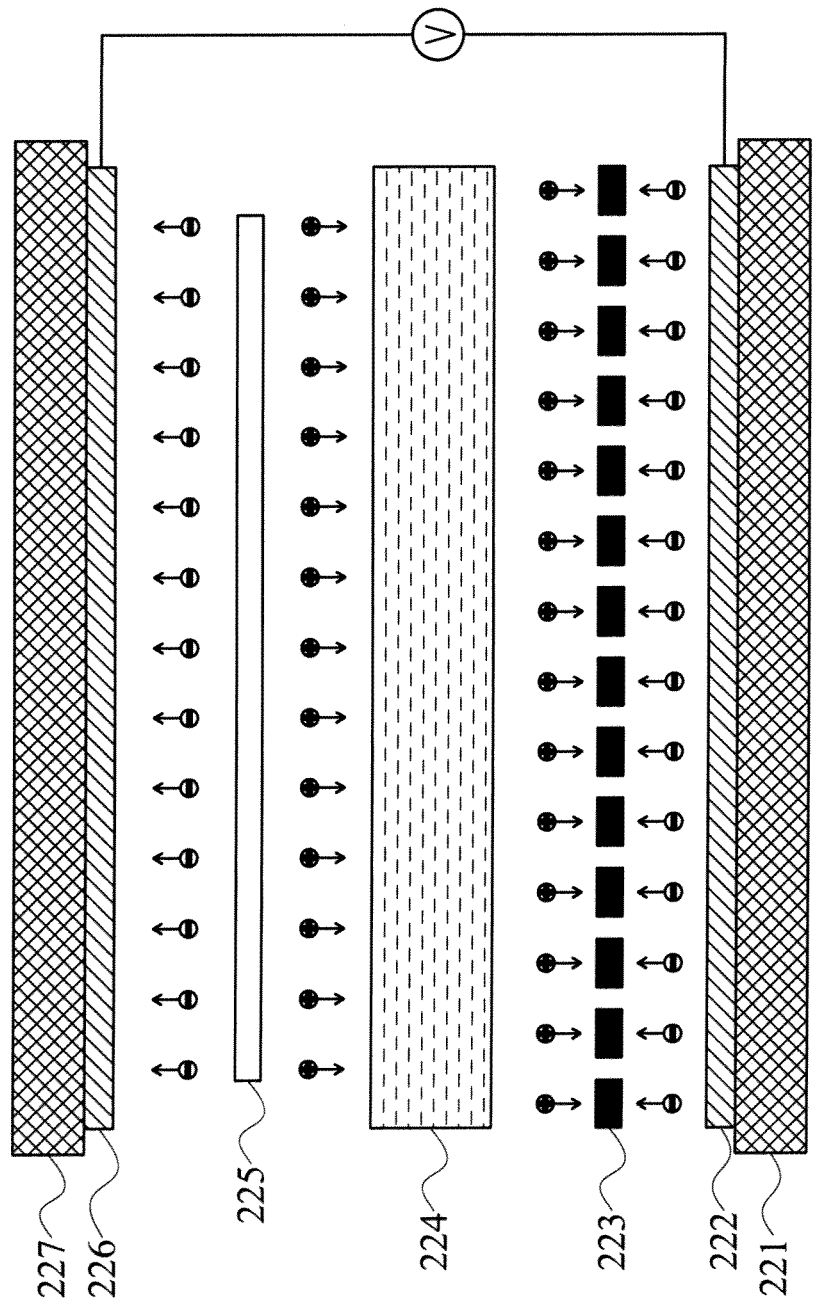
FIG. 10 is a schematic view of a second coloration status of an electrochromic element of a 3D image display device in accordance with a first preferred embodiment of the present invention.

With reference to FIGS. 9 and 10 for a perspective view of a 3D image display device after being rotated and a schematic view of a second coloration status of an electrochromic element in accordance with a first preferred embodiment of the present invention respectively, if the 3D image display device 2 is disposed in a vertical direction, and the sensing element 24 senses a change of the position of disposing the 3D image display device 2 with respect to the standard rotation axis to transmit a sensing signal 241 to the control element 23 correspondingly, the control element 23 applies a reverse bias voltage to the first transparent conductive element 222 and the second transparent conductive element 226. In addition, the display module 21 can change its image display direction through a sensing element (not shown in the figure), such that the image display direction corresponds to the angle of disposing position of the 3D image display device 2. In this preferred embodiment, the sensing element 24 is a prior art, and thus will not be described here. Now, the ions dispersed and moved to the second electrochromic elements 225 are returned back to the electrolyte layer 224 along the reverse path due to the effect of a change of direction of the electric field, and then dispersed and moved from the electrolyte layer 224 to the first electrochromic elements 223. In the meantime, the electrons are returned from the second electrochromic elements 225 to the second transparent conductive element 226, and moved from the first transparent conductive element 222 to the first electrochromic element 223 to maintain the first electrochromic elements 223 and the second electrochromic elements 225 electrically neutral. Therefore, the second electrochromic elements 225 are changed from an opaque state to a transparent state gradually, and the first electrochromic elements 223 are changed from a transparent state to an opaque state to form a light shading area, so as to produce a parallax barrier. Therefore, the left-eye image L and right-eye image R generated by the display module 21 can be used for producing a parallax barrier by the first electrochromic elements 223, and a portion of the superimposed image area is removed, and the 3D image S is formed in the viewer's brain. Therefore, the sensing element 24 can determine the extent of the rotation or the change of the disposing direction of the 3D image display device 2 with respect to the standard rotation axis, such that the first electrochromic elements 223 or the second electrochromic elements 225 can correspond to the disposing direction to produce the corresponding parallax barrier to provide the most natural and appropriate way for users to view the 3D image S, regardless of how the 3D image display device 2 is disposed.

Figure 11:
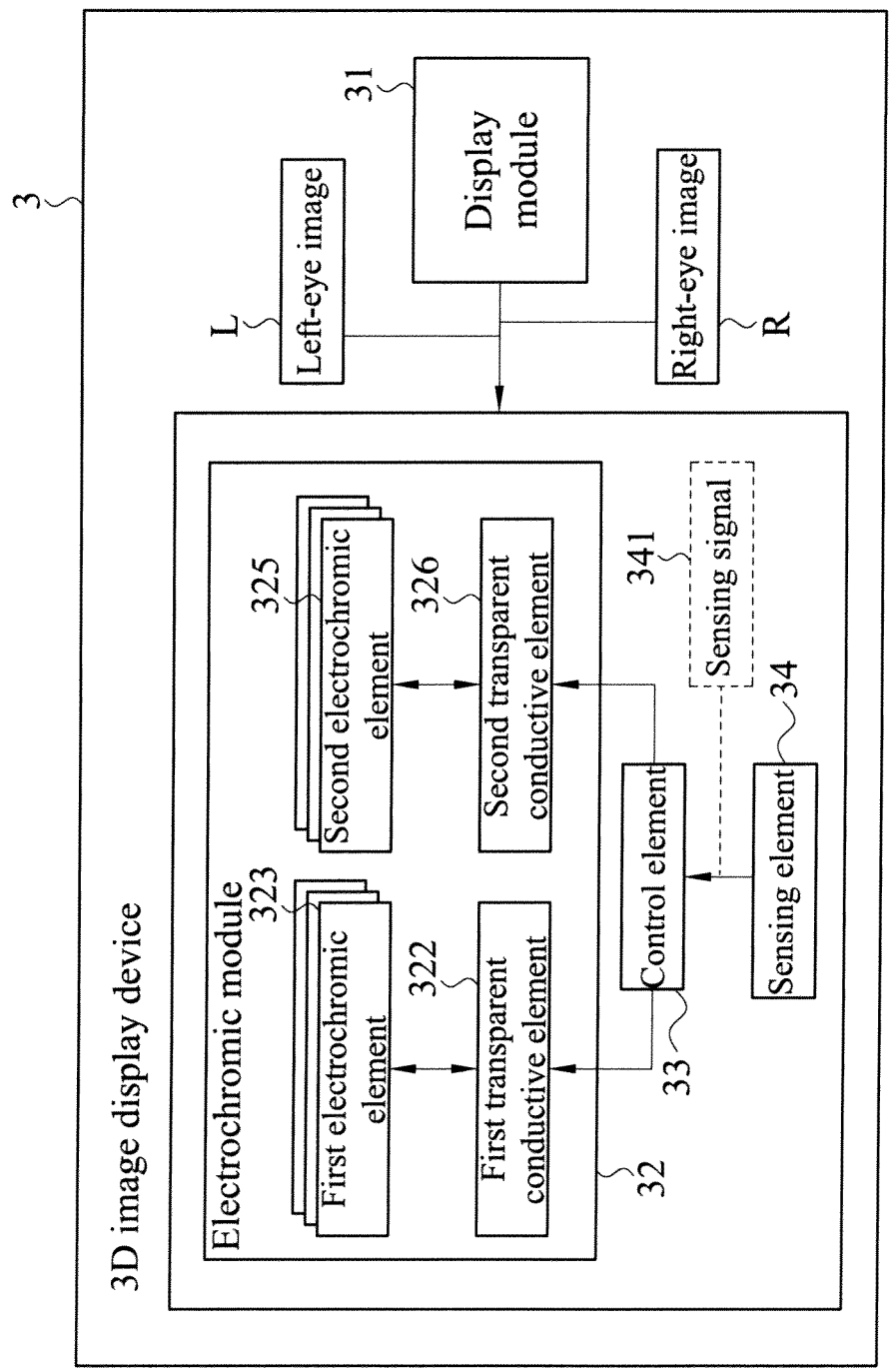
FIG. 11 is a block diagram of a 3D image display device in accordance with a second preferred embodiment of the present invention.
Figure 12:
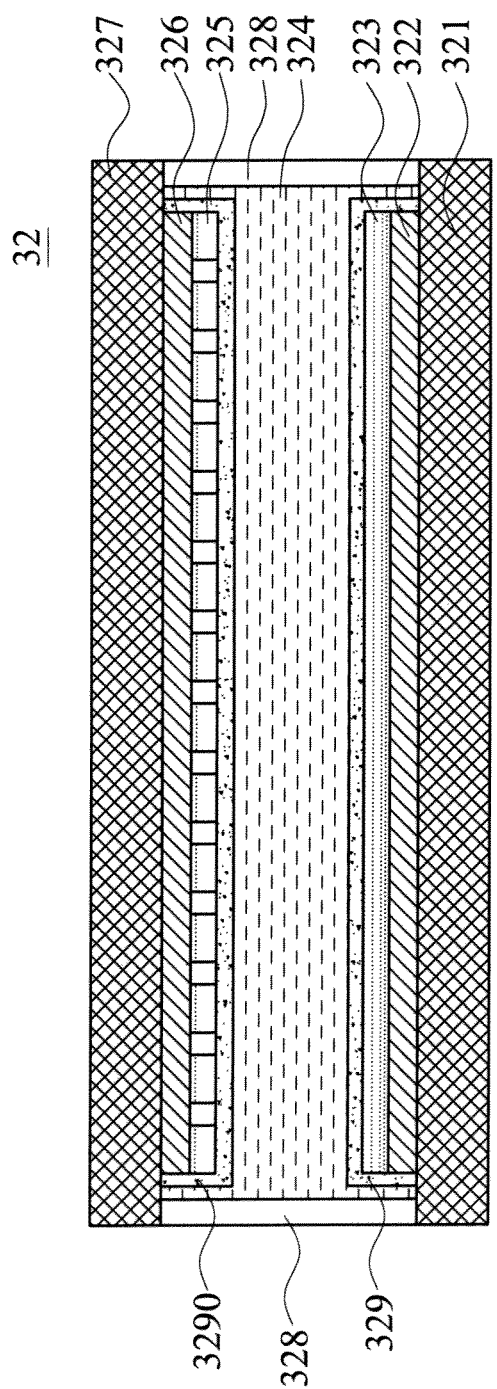
FIG. 12 is a cross-sectional view of an electrochromic module used by a 3D image display device in accordance with a second preferred embodiment of the present invention.

With reference to FIGS. 11 and 12 for a block diagram of a 3D image display device and a cross-sectional view of an electrochromic module in accordance with a second preferred embodiment of the present invention respectively, the 3D image display device 3 comprises a display module 31, an electrochromic module 32, a control element 33 and a sensing element 34.

The electrochromic module 32 comprises a first transparent substrate 321, a first transparent conductive element 322, a plurality of first electrochromic elements 323, an electrolyte layer 324, a plurality of second electrochromic elements 325, a second transparent conductive element 326, a second transparent substrate 327, at least one barrier layer 328, a first protective layer 329 and a second protective layer 3290.

In this preferred embodiment, the display module 31, the control element 33, the sensing element 34, the first transparent substrate 321, the first electrochromic elements 323, the first transparent conductive element 322, the second electrochromic elements 325, the second transparent conductive element 326, the second transparent substrate 327 and the barrier layer 328 are the same as those in the first preferred embodiment, and thus will not be described here again.

Figure 13:
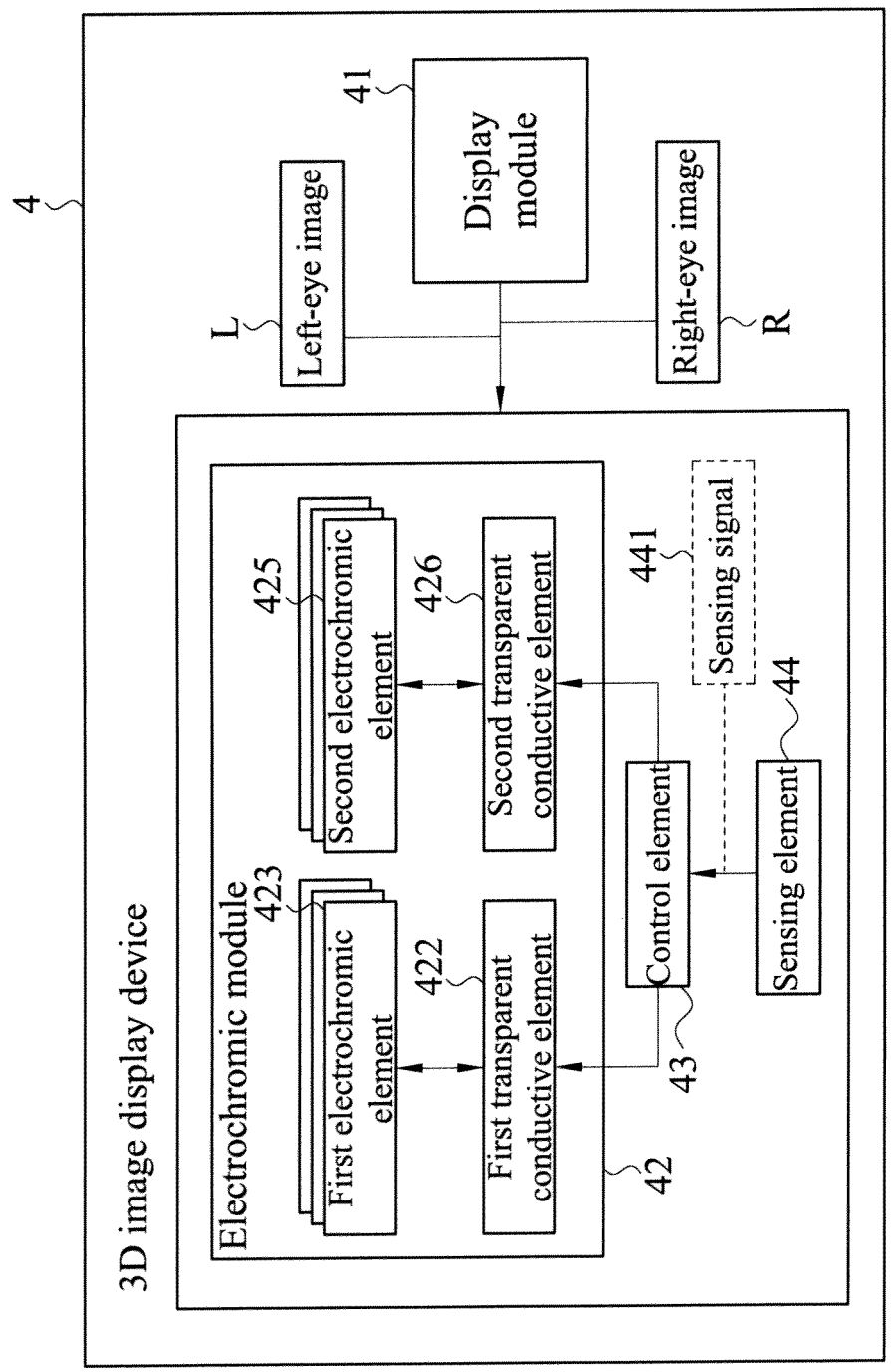
FIG. 13 is a block diagram of a 3D image display device in accordance with a third preferred embodiment of the present invention.
Figure 14:
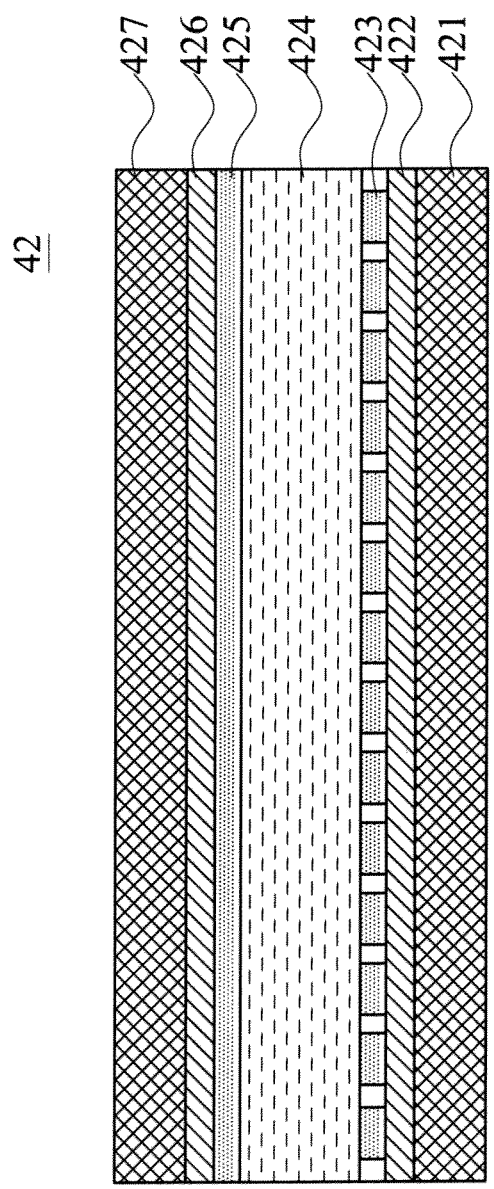
FIG. 14 is a cross-sectional view of an electrochromic module used by a 3D image display device in accordance with a third preferred embodiment of the present invention.

The difference between this preferred embodiment and the first preferred embodiment resides on that the electrochromic module 32 further includes a first protective layer 329 and a second protective layer 3290. The first protective layer 329 is disposed between the electrolyte layer 324 and the first electrochromic elements 323, and the second protective layer 3290 is disposed between the electrolyte layer 324 and the second electrochromic elements 325. The first protective layer 329 and the second protective layer 3290 are provided for preventing liquids from being leaked from the liquid-state electrolyte layer 324 during the packaging process and corroding the first electrochromic elements 323, the second electrochromic elements 325, the first transparent conductive element 322 and the second transparent conductive element 326 that may reduce the using life of the display apparatus. The first protective layer 329 and the second protective layer 3290 can be a silicon dioxide ($SiO_2$), aluminum oxide ($Al_2O_3$), tetramethyldisiloxane or carbon-silicon-oxygen film. With reference to FIGS. 13 and 14 for a block diagram of a 3D image display device and a cross-sectional view of an electrochromic module in accordance with a third preferred embodiment of the present invention respectively, the 3D image display device 4 comprises a display module 41, an electrochromic module 42, a control element 43 and a sensing element 44.

The electrochromic module 42 comprises a first transparent substrate 421, a first transparent conductive element 422, a plurality of first electrochromic elements 423, an electrolyte layer 424, a plurality of the second electrochromic elements 425, a second transparent conductive element 426 and a second transparent substrate 427.

In this preferred embodiment, the structure and material of the display module 41, the control element 43, the sensing element 44, the first transparent substrate 421, the first transparent conductive element 422, the first electrochromic elements 423, the second electrochromic elements 425, the second transparent conductive element 426 and the second transparent substrate 427 are the same as those of the first preferred embodiment, and thus will not be described here again.

The difference of this preferred embodiment and the first preferred embodiment resides on that the electrolyte layer 424 of this preferred embodiment is a solid-state electrolyte for preventing liquids from being leaked from the liquid-state electrolyte, wherein the solid-state electrolyte 424 is a proton exchange membrane such as an ionomer membrane, an organic-inorganic hybrid membrane and a membrane based on polymer and oxo-acids, and the ionomer membrane is a polymerized perfluorosulfonic acid (PFSA) membrane.

Figure 15:
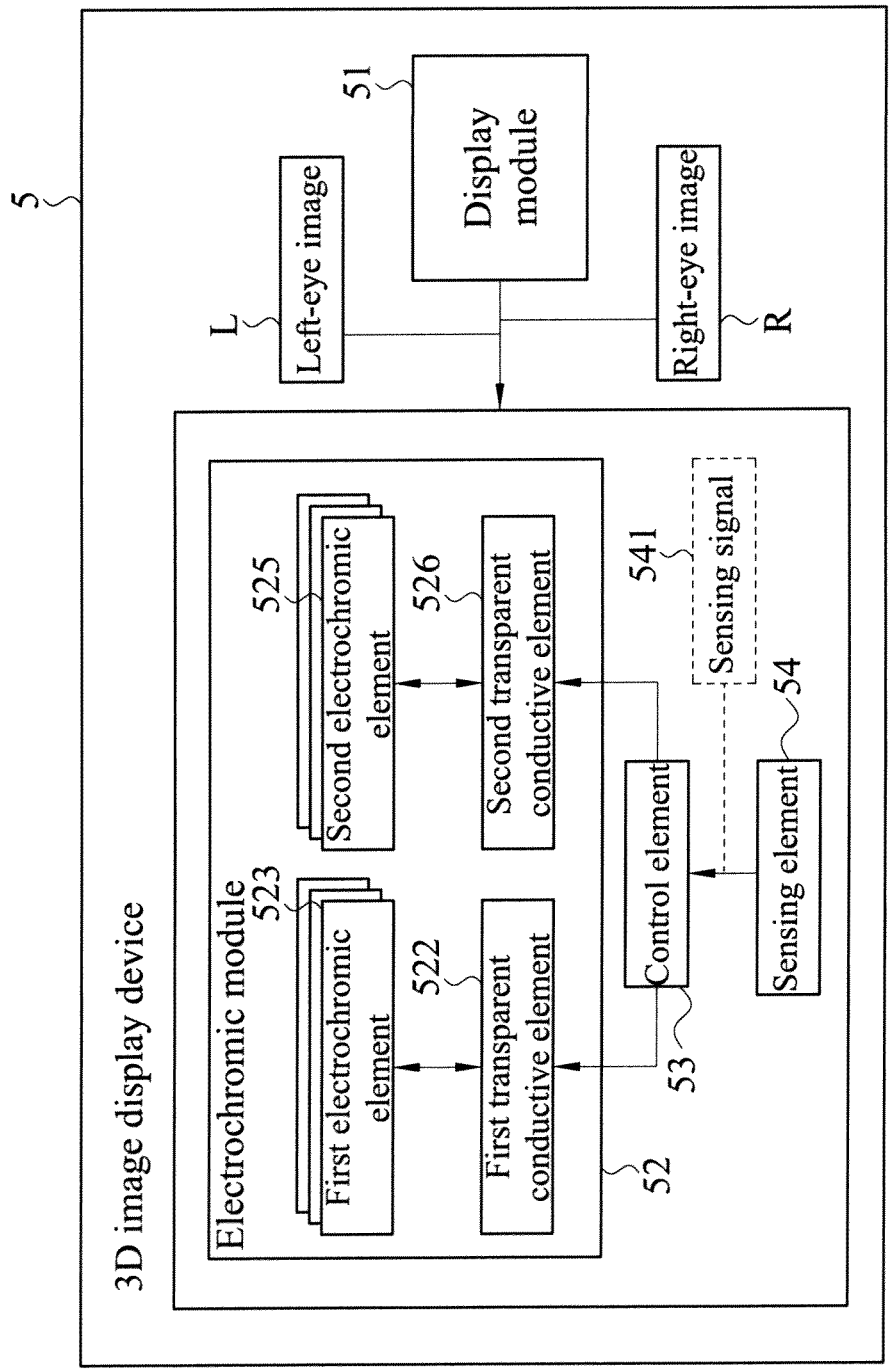
FIG. 15 is a block diagram of a 3D image display device in accordance with a fourth preferred embodiment of the present invention.
Figure 16:
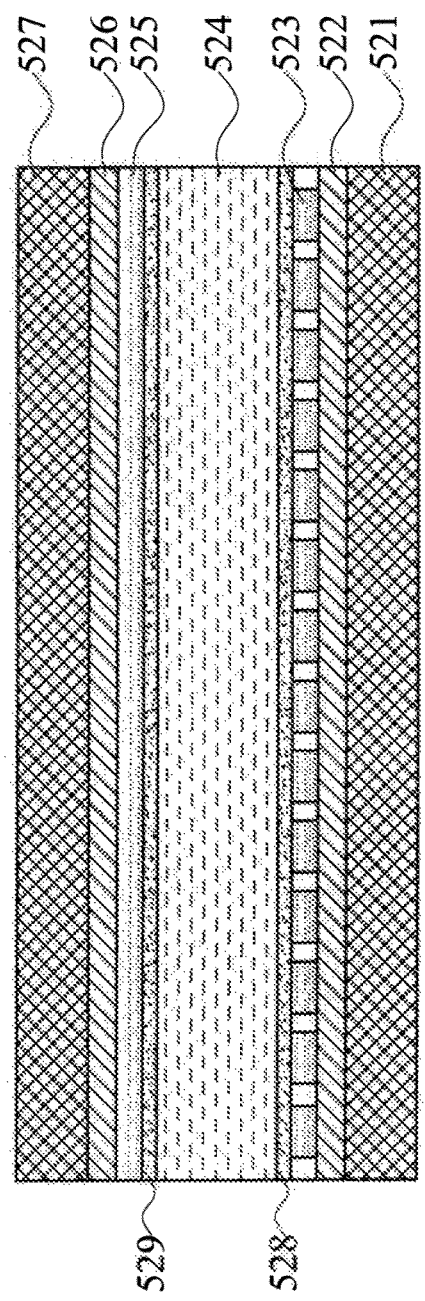
FIG. 16 is a cross-sectional view of an electrochromic module used by a 3D image display device in accordance with a fourth preferred embodiment of the present invention.

With reference to FIGS. 15 and 16 for a block diagram of a 3D image display device and a cross-sectional view of an electrochromic module in accordance with a fourth preferred embodiment of the present invention respectively, the 3D image display device 5 comprises a display module 51, an electrochromic module 52, a control element 53 and a sensing element 54.

The electrochromic module 52 comprises a first transparent substrate 521, a first transparent conductive element 522, a plurality of first electrochromic elements 523, an electrolyte layer 524, a plurality of second electrochromic elements 525, a second transparent conductive element 526, a second transparent substrate 527, a first protective layer 528 and a second protective layer 529.

In this preferred embodiment, the structure, function and material of the first transparent substrate 521, the first transparent conductive element 522, the first electrochromic elements 523, the electrolyte layer 524, the second electrochromic elements 525, the second transparent conductive element 526 and the second transparent substrate 527 are the same as those of the third preferred embodiment, and thus will not be described here again.

The difference between this preferred embodiment and the third preferred embodiment resides on that the electrochromic module 52 of this preferred embodiment further comprises a first protective layer 528 and a second protective layer 529, and the first protective layer 528 is disposed between the electrolyte layer 524 and the first electrochromic elements 523, and the second protective layer 529 is disposed between the electrolyte layer 524 and the second electrochromic elements 525, and the first and second protective layers 528, 529 are used for isolating the electrolyte layer 524 to protect the first electrochromic elements 523 and the second electrochromic elements 525. The first protective layer 528 and the second protective layer 529 are silicon dioxide ($SiO_2$), aluminum oxide ($Al_2O_3$), tetramethyldisiloxane or carbon-silicon-oxygen films.

To achieve the effect of switching the horizontal and vertical grating, each of the first electrochromic elements 223, 323, 423, 523 and second electrochromic elements 225, 325, 425, 525 of the aforementioned preferred embodiment are installed alternately with one another, and the selected materials are preferably anodic coloration materials for the first electrochromic elements 223, 323, 423, 523 and cathodic coloration materials for the second electrochromic elements 225, 325, 425, 525, and vice versa. When the first electrochromic elements 223, 323, 423, 523 are decolored, the second electrochromic elements 225, 325, 425, 525 are colored according to the reverse mechanism. If the second electrochromic elements 225, 325, 425, 525 are decolored, then the first electrochromic elements 223, 323, 423, 523 will be colored.

Figure 17:
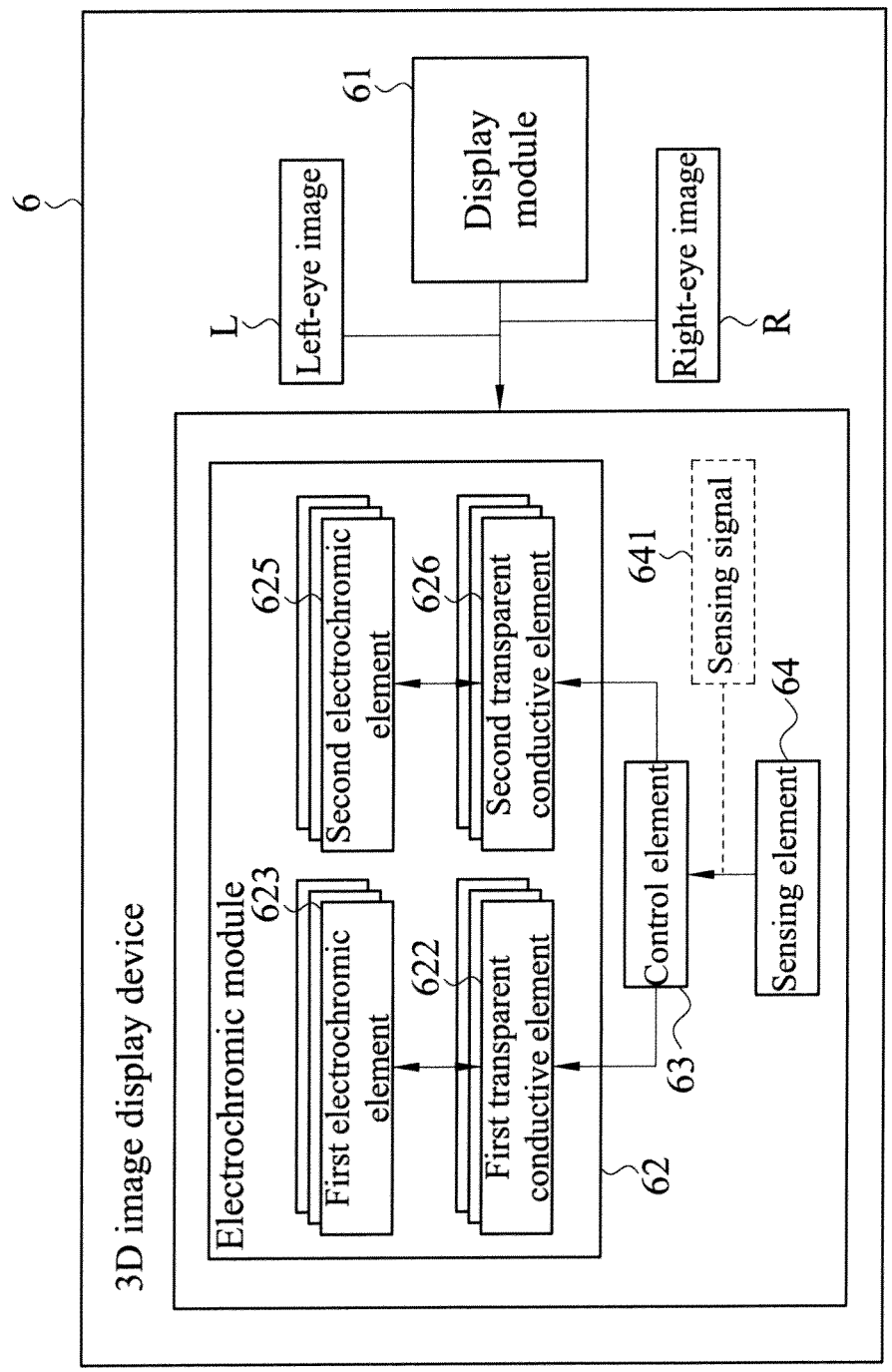
FIG. 17 is a block diagram of a 3D image display device in accordance with a fifth preferred embodiment of the present invention.
Figure 18:
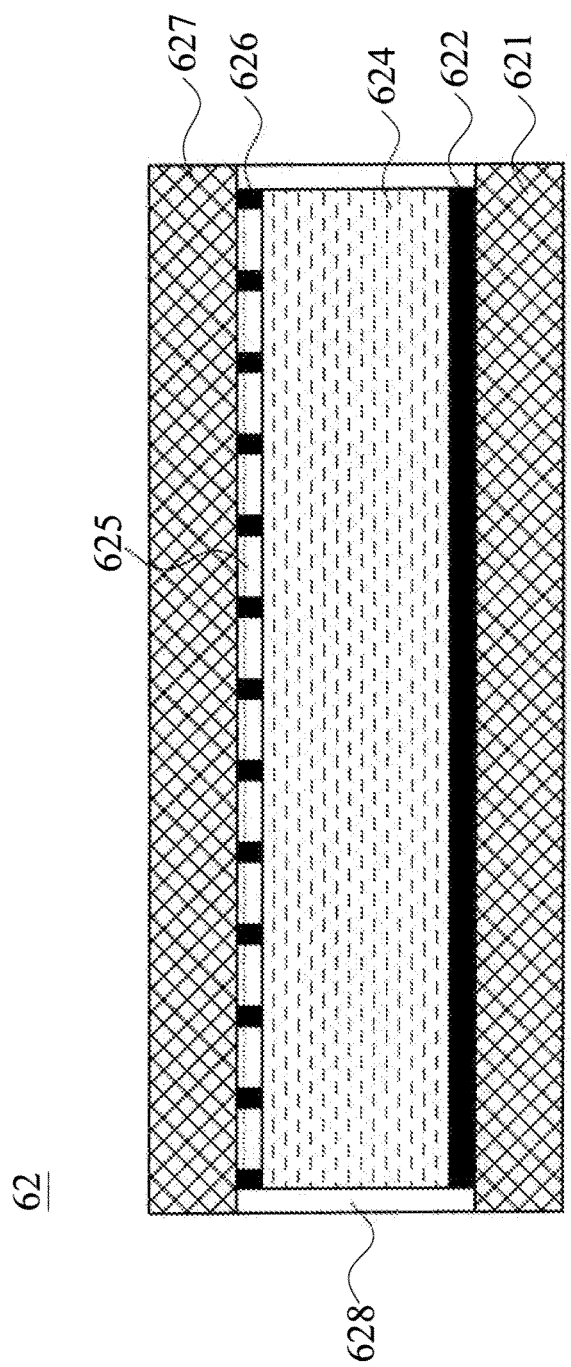
FIG. 18 is a cross-sectional view of an electrochromic module used by a 3D image display device in accordance with a fifth preferred embodiment of the present invention.

However, the aforementioned structures have the shortcoming that the coloration and decoration mechanisms for the first and second electrochromic elements are opposite, and thus it is necessary to notice the limitations of selecting the materials for the cathodic coloration or anodic coloration. With reference to FIGS. 17 and 18 for a block diagram of a 3D image display device and a cross-sectional view of an electrochromic module in accordance with a fifth preferred embodiment of the present invention respectively, the 3D image display device 6 comprises a display module 61, an electrochromic module 62, a control element 63 and a sensing element 64.

The electrochromic module 62 comprises a first transparent substrate 621, a plurality of first transparent conductive elements 622, a plurality of first electrochromic elements 623, an electrolyte layer 624, a plurality of second electrochromic elements 625, a plurality of second transparent conductive elements 626, a second transparent substrate 627, and a barrier layer 628.

Figure 19:
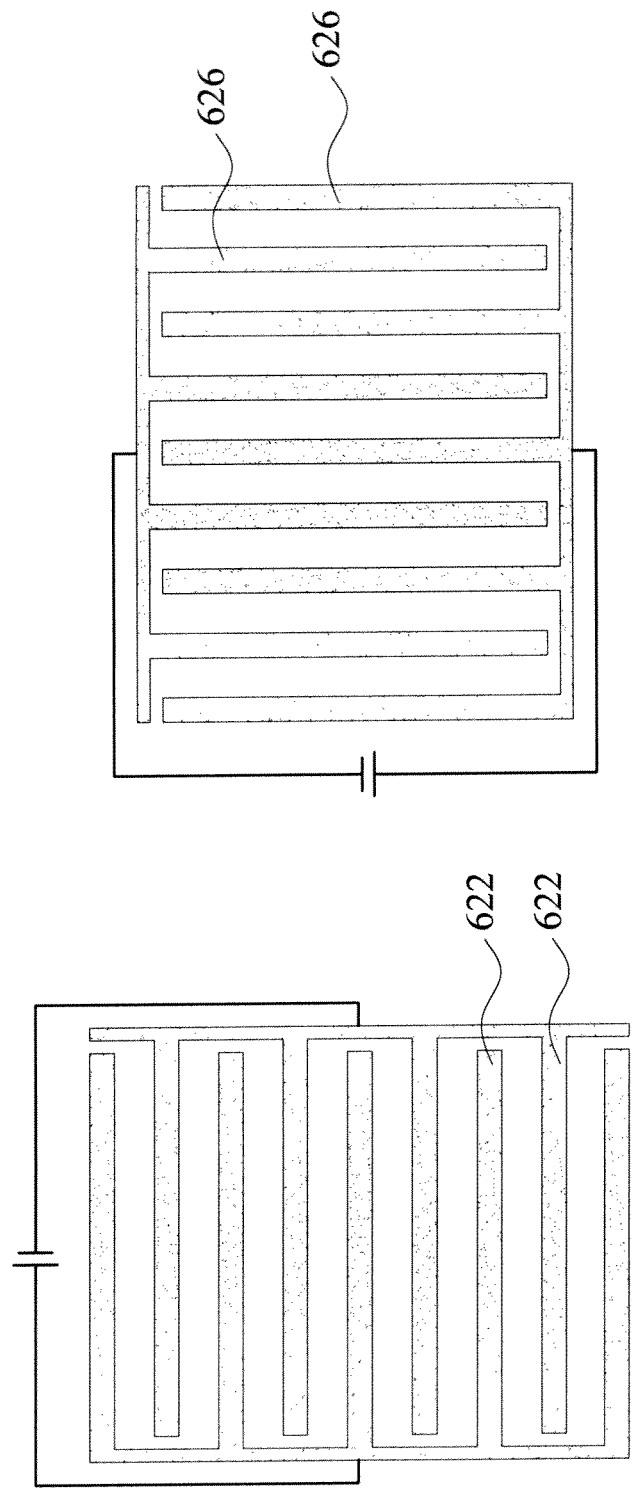
FIG. 19 is a schematic view of first and second electrochromic elements of an electrochromic module of a 3D image display device in accordance with a fifth preferred embodiment of the present invention.

Compared with the forgoing first to fourth preferred embodiments, the differences reside on that the first transparent conductive elements 622 are arranged with an interval apart from each other on the first transparent substrate 621 and applied with positive and negative voltages alternately, such that the first transparent conductive elements 622 on both left and right sides of each electrochromic element 623 have different voltages to produce a voltage difference between the electrochromic elements 623, and the same arrangement applies to the second transparent conductive elements 626, wherein the positive and negative voltages are applied to the first transparent conductive elements 622 alternately. Unlike each of the foregoing preferred embodiments having only one set of bias voltage, this preferred embodiment has two sets of bias voltages for controlling the first electrochromic element 623 and the second electrochromic element 625 respectively. The way of installing the first and second transparent conductive elements 622, 626 is shown in FIG. 19. To change the color of the first electrochromic element 623 without changing the second electrochromic element 625 at the same time or successfully enter ions of the electrolyte layer 624 into the first electrochromic elements 623, a positive voltage is applied to all of the second transparent conductive elements 626 to drive the ions in the electrolyte layer 624 to move in a direction towards the first electrochromic elements 623. On the contrary, if the color of the second electrochromic element 625 is changed, a positive voltage is applied to all of the first transparent conductive elements 622 to drive the ions into the second electrochromic elements 625.

Figure 20:
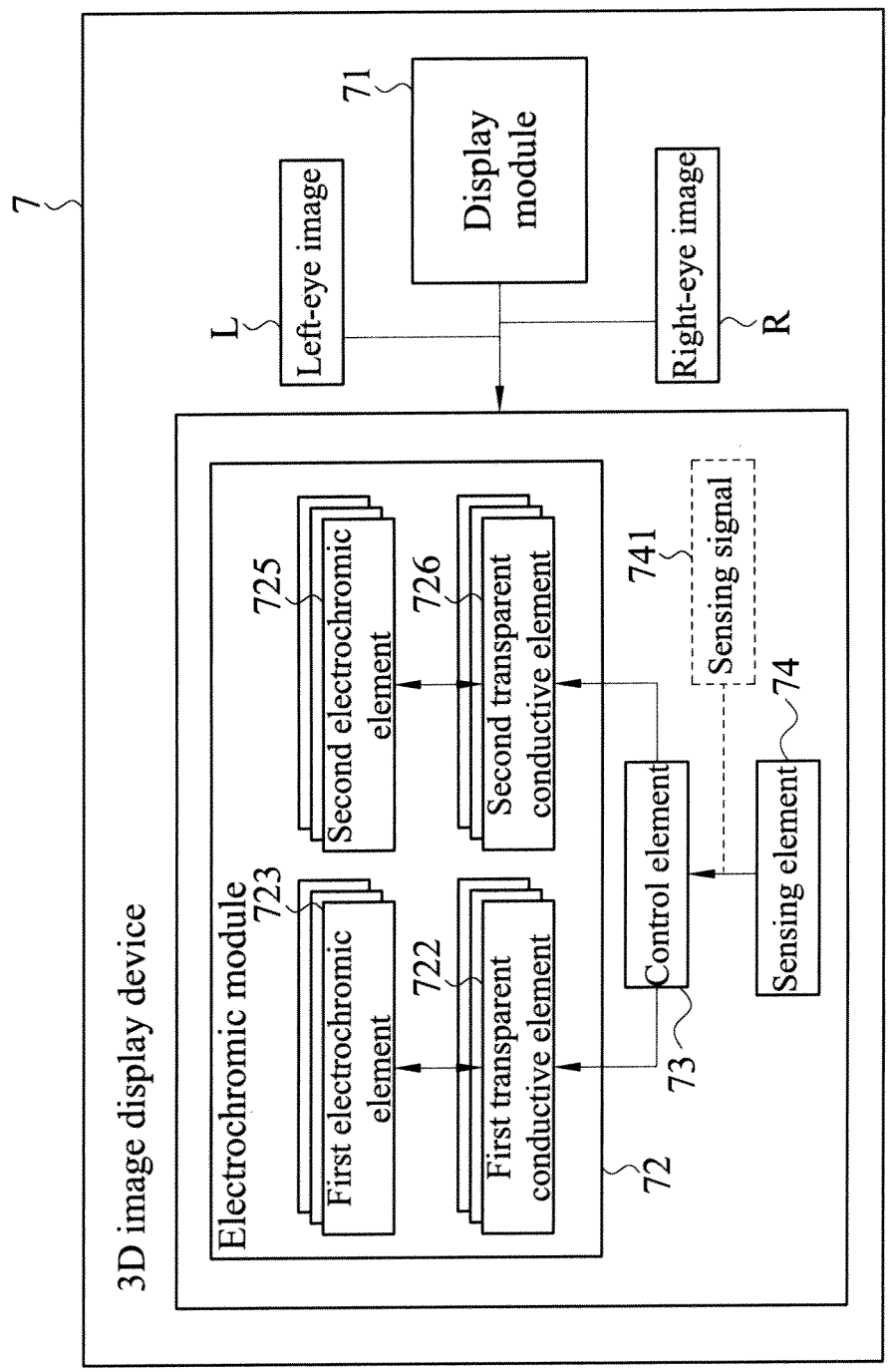
FIG. 20 is a block diagram of a 3D image display device in accordance with a sixth preferred embodiment of the present invention.
Figure 21:
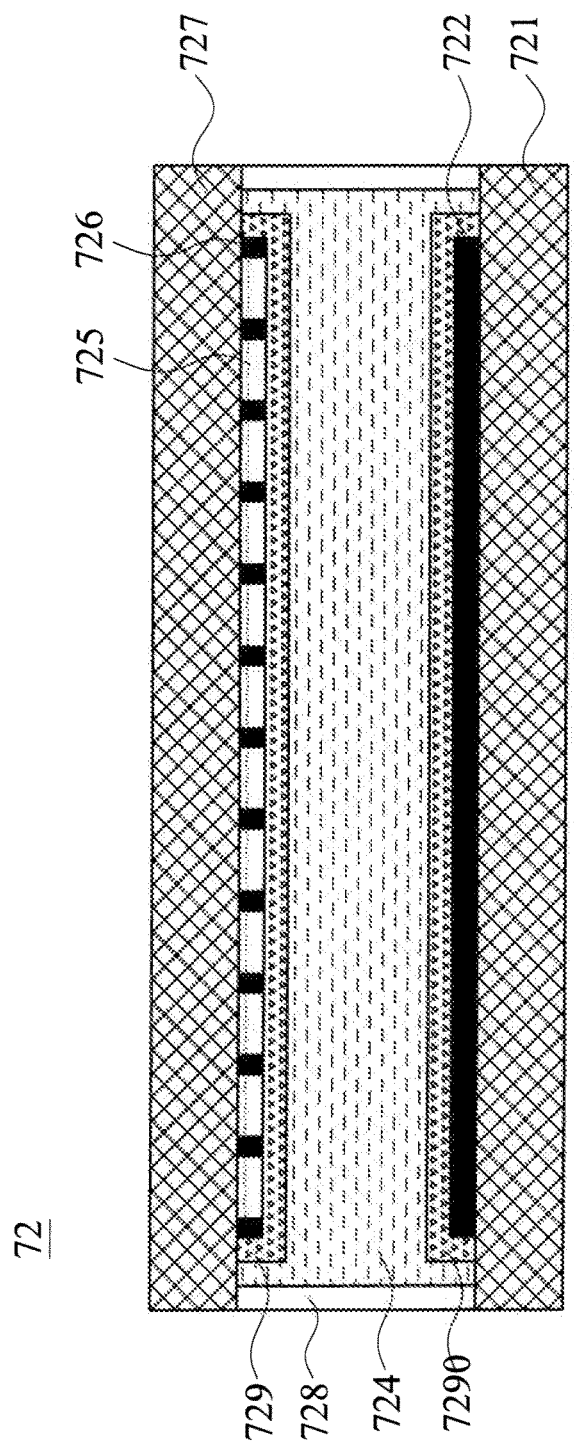
FIG. 21 is a cross-sectional view of an electrochromic module used by a 3D image display device in accordance with a sixth preferred embodiment of the present invention.

With reference to FIGS. 20 and 21 for a block diagram of a 3D image display device and a cross-sectional view of an electrochromic module in accordance with a sixth preferred embodiment of the present invention respectively, the 3D image display device 7 comprises a display module 71, an electrochromic module 72, a control element 73 and a sensing element 74.

The electrochromic module 72 comprises a first transparent substrate 721, a plurality of first transparent conductive elements 722, a plurality of first electrochromic elements 723, an electrolyte layer 724, a plurality of second electrochromic elements 725, a plurality of second transparent conductive elements 726, a second transparent substrate 727 and a barrier layer 728.

Compared with the fifth preferred embodiment, this preferred embodiment further comprises a first protective layer 729 and a second protective layer 7290. The structure and functions of the first protective layer 729 and the second protective layer 7290 are the same as those of the second preferred embodiment, and thus will not be described here again.

In the fifth and sixth preferred embodiments, the electrolyte layers 624, 724 are made of liquid-state electrolytes used for the purpose of illustrating the present invention, but similar to the first to fourth preferred embodiments, the electrolyte layers 624, 724 can be solid-state electrolytes or liquid-state electrolytes, and the materials are the same as those described in the aforementioned preferred embodiments, and thus not be described here again.

In summation of the description above, the 3D image display device and its electrochromic module in accordance with the present invention comply with patent application requirements, and thus the present invention is duly filed for patent application.

While the invention has been described by means of specific embodiments, numerous modifications and variations could be made thereto by those generally skilled in the art without departing from the scope and spirit of the invention set forth in the claims.

What is claimed is:

1. A 3D image display device, comprising:
   a display module, for generating a left-eye image and a right-eye image;
   an electrochromic module, including:
   a first transparent substrate;
   a first transparent conductive element, installed on a side of the first transparent substrate;
   a plurality of first electrochromic elements, installed on a side of the first transparent conductive element;
   an electrolyte layer, disposed on a side of the first electrochromic elements;
   a plurality of second electrochromic elements, installed on a side of the electrolyte layer;
   a second transparent conductive element, installed on a side of the second electrochromic elements, and the second electrochromic elements being orthogonally arranged with the first electrochromic elements; and
   a second transparent substrate, disposed on a side of the second transparent conductive element;
   a control element, electrically coupled to the first transparent conductive element and the second transparent conductive element, for switching a voltage of the first transparent conductive element and the second transparent conductive element; and
   a sensing element, electrically coupled to the control element, for sensing a rotating direction of the 3D image display device to transmit a sensing signal to the control element accordingly to change the color of the first electrochromic elements or the second electrochromic elements, so as to produce a parallax barrier.

2. The 3D image display device of claim 1, further comprising a first protective layer and a second protective layer, and the first protective layer being disposed between the electrolyte layer and the first electrochromic element, and the second protective layer being disposed between the electrolyte layer and the second electrochromic elements.

3. The 3D image display device of claim 2, wherein the first protective layer and the second protective layer are silicon dioxide ($SiO_2$), aluminum oxide ($Al_2O_3$), tetramethyldisiloxane or carbon-silicon-oxygen film.

4. The 3D image display device of claim 1, wherein the first electrochromic elements and the second electrochromic elements are anodic coloration transition metal oxides, cathodic coloration transition metal oxides, cathodic/anodic coloration transition metal oxides or organic electrochromic materials.

5. The 3D image display device of claim 4, wherein the first electrochromic elements and the second electrochromic elements are anodic coloration transition metal oxides selected from the collection of chromium oxide ($Cr_2O_3$), nickel oxide ($NiO_x$), iridium oxide ($IrO_2$), manganese oxide ($MnO_2$), nickel hydroxide [$Ni(OH)_2$], tantalum pentoxide ($Ta_2O_5$) and ferric ferrocyanide ($Fe_4[Fe(CN)_6]_3$).

6. The 3D image display device of claim 4, wherein the first electrochromic elements and the second electrochromic elements are cathodic coloration transition metal oxides selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$), and tantalum pentoxide ($Ta_2O_5$).

7. The 3D image display device of claim 4, wherein the first electrochromic elements and the second electrochromic elements are cathodic/anodic coloration transition metal oxides selected from the collection of vanadium oxide ($V_2O_2$), rhodium oxide ($Rh_2O_3$) and cobalt oxide ($CoO_x$).

8. The 3D image display device of claim 4, wherein the organic electrochromic material is a redox compound selected from the collection of bipyridyls, viologen, anthraquinone, tetrathiafulvaleneor, pyrazolone and a derivative of the above.

9. The 3D image display device of claim 4, wherein the organic electrochromic material is a conductive polymer selected from the collection of polyacetylene, polyaniline, polypyrrole, polythiophene, poly-3-alkylthiophene, polyfuran, polyphenylene, aromatic polyamide/polyimide, polyphenylenevinylene and a derivative of the above.

10. The 3D image display device of claim 4, wherein the organic electrochromic material is a polymeric metal complex or its derivative.

11. The 3D image display device of claim 4, wherein the organic electrochromic material is a transition metal, a lanthanum based ligand complex and its derivatives.

12. The 3D image display device of claim 4, wherein the organic electrochromic material is a metal phthalocyanine and its derivative.

13. The 3D image display device of claim 4, wherein the organic electrochromic material is ferrocene or iron(III) thiocyanate dissolved in water solution, hexacyanoferrate dissolved in tetracyanoquinone or sulfur (IV) cyanide dissolved in acetonitrile.

14. The 3D image display device of claim 1, wherein the electrolyte layer is a solid-state electrolyte or a liquid-state electrolyte.

15. The 3D image display device of claim 14, wherein the solid-state electrolyte is a proton exchange membrane.

16. The 3D image display device of claim 15, wherein the proton exchange membrane is one selected from the collection of an ionomer membrane, an organic-inorganic hybrid membrane, and a membrane based on polymer and oxo-acids.

17. The 3D image display device of claim 16, wherein the ionomer membrane is a polymerized perfluorosulfonic acid (PFSA) film.

18. The 3D image display device of claim 14 wherein the liquid-state electrolyte is lithium perchlorate ($LiClO_4$), potassium hydroxide (KOH), sodium hydroxide (NaOH) or sodium silicate ($Na_2SiO_3$).

19. The 3D image display device of claim 1, wherein when the first and second transparent conductive elements come with a plurality, the first transparent conductive elements are arranged with an interval apart from each other among the first electrochromic elements, and the second transparent conductive elements are arranged with an interval apart from each other among the second electrochromic elements.

20. The 3D image display device of claim 19, wherein the first electrochromic elements are controlled for a coloration/decoloration according to a voltage change of the first transparent conductive elements, and the second electrochromic elements are controlled for a coloration/decoloration according to a voltage change of the second transparent conductive elements.

21. The 3D image display device of claim 1, wherein the sensing element is a gyroscope or an optoelectronic direction sensor.

* * * * *